US010764668B2

(12) United States Patent
Schrader et al.

(10) Patent No.: US 10,764,668 B2
(45) Date of Patent: Sep. 1, 2020

(54) SENSOR MOUNT AND CIRCUMAURAL HEADSET OR HEADPHONES WITH ADJUSTABLE SENSOR

(71) Applicant: LIGHT SPEED AVIATION, INC., Lake Oswego, OR (US)

(72) Inventors: Allan Schrader, Lake Oswego, OR (US); Matthew Raymond Evonuk, Tualatin, OR (US); Brian David Frost, Lake Oswego, OR (US)

(73) Assignee: LIGHTSPEED AVIATION, INC., Lake Oswego, OR (US)

( * ) Notice: Subject to any disclaimer, the term of this patent is extended or adjusted under 35 U.S.C. 154(b) by 90 days.

(21) Appl. No.: 15/974,682

(22) Filed: May 8, 2018

(65) Prior Publication Data

US 2019/0075388 A1 Mar. 7, 2019

Related U.S. Application Data

(63) Continuation-in-part of application No. 15/697,630, filed on Sep. 7, 2017.

(51) Int. Cl.
*H04R 1/10* (2006.01)
*G06F 3/16* (2006.01)
*G06F 3/01* (2006.01)

(52) U.S. Cl.
CPC .......... *H04R 1/1041* (2013.01); *G06F 3/011* (2013.01); *G06F 3/165* (2013.01); *G06F 3/167* (2013.01);
(Continued)

(58) Field of Classification Search
CPC .... H04R 1/1008; H04R 1/105; H04R 1/1058; H04R 1/1066; H04R 1/1091; H04R 1/2884; H04R 5/0335
(Continued)

(56) References Cited

U.S. PATENT DOCUMENTS 3,644,833 A 2/1972 McIntosh
4,775,116 A 10/1988 Klein
(Continued)

FOREIGN PATENT DOCUMENTS

EP 2999233 A1 3/2016
WO 2015088980 A1 6/2015
(Continued)

OTHER PUBLICATIONS

Ming-Zhee Poh et al.; Cardiovascular Monitoring Using Earphones and a Mobile Device; IEEE CS; MIT Media Lab; Sep. 22, 2012; pp. 18-26.
(Continued)

*Primary Examiner* — Katherine A Faley
(74) *Attorney, Agent, or Firm* — Brooks Kushman PC

(57) ABSTRACT

An adjustable sensor mount and associated headset that may include a band with circumaural earcups and cushions may be configured to position a sensor forward of the tragus of a user. The headset may include a speaker, a microphone, and a controller. The mount may include a base configured for sliding engagement with the cushion and a sensor holder secured to the base and configured to receive the sensor. The base may be made of a generally C-shaped resilient plastic or metal material. The holder may be pivotably secured and/or slide relative to the base. The holder may include a support arm that slides and/or pivots relative to the base and receives a housing adapted to secure the sensor. The housing may slide and/or rotate relative to the support arm, and may have an elastomeric covering. Sensor signals may be processed to provide a gating signal for the microphone.

14 Claims, 9 Drawing Sheets

(52) U.S. Cl.
CPC ........... *H04R 1/105* (2013.01); *H04R 1/1008* (2013.01); *H04R 1/1075* (2013.01); *H04R 1/1083* (2013.01); *H04R 2201/107* (2013.01); *H04R 2430/01* (2013.01); *H04R 2460/01* (2013.01)

(58) Field of Classification Search
USPC .................................. 381/370–379, 381–384
See application file for complete search history.

(56) References Cited

U.S. PATENT DOCUMENTS

| | | | |
|---|---|---|---|
| 5,372,134 | A | 12/1994 | Richardson |
| 6,498,942 | B1 | 12/2002 | Esenaliev et al. |
| 7,040,319 | B1 | 5/2006 | Kelly et al. |
| 8,699,742 | B2 | 4/2014 | Heiman et al. |
| 9,826,941 | B1 | 11/2017 | Serovy et al. |
| 2007/0173611 | A1 | 7/2007 | Yoshimi et al. |
| 2008/0013777 | A1 | 1/2008 | Park et al. |
| 2009/0010474 | A1 | 1/2009 | Ouryouji |
| 2009/0214060 | A1 | 8/2009 | Chuang et al. |
| 2010/0131269 | A1 | 5/2010 | Park et al. |
| 2010/0217098 | A1 | 8/2010 | LeBoeuf et al. |
| 2010/0217103 | A1 | 8/2010 | Abdul-Hafiz et al. |
| 2012/0014553 | A1 | 1/2012 | Bonanno |
| 2012/0278070 | A1 | 11/2012 | Herve et al. |
| 2013/0343585 | A1 | 12/2013 | Bennett et al. |
| 2015/0146893 | A1 | 5/2015 | Kunimoto |
| 2015/0156598 | A1 | 6/2015 | Sun et al. |
| 2015/0189441 | A1 | 7/2015 | Oishi et al. |
| 2016/0029974 | A1 | 2/2016 | Armstrong et al. |
| 2016/0060926 | A1* | 3/2016 | Kim ................ G06F 1/163 361/679.01 |
| 2016/0317060 | A1* | 11/2016 | Connor ............. G01J 3/0294 |
| 2017/0099539 | A1 | 4/2017 | DiCenso et al. |
| 2018/0303392 | A1 | 10/2018 | Everman et al. |
| 2018/0310893 | A1 | 11/2018 | Everman et al. |
| 2019/0167211 | A1 | 6/2019 | Everman et al. |

FOREIGN PATENT DOCUMENTS

| | | |
|---|---|---|
| WO | 2016022295 A1 | 2/2016 |
| WO | 2016140835 A1 | 9/2016 |

OTHER PUBLICATIONS

Muhammad Farooq et al.; A Novel Wearable Device for Food Intake and Physical Activity Recognition; Department of Electrical and Computer Engineering, University of Alabama; Sensors Jul. 11, 2016; pp. 1-13.

Oliver Amft; A Wearable Earpad Sensor for Chewing Monitoring; ACTLab, Signal Processing Systems, TU Eindhoven, The Netherlands, IEEE Sensors 2010; pp. 222-227.

Bedri et al.; Stick It in Your Ear: Building an In-Ear Jaw Movement Ubicomp/ISWC' 15 Adjunct; Sep. 7-11, 2015, Osaka, Japan; pp. 1333-1338.

International Search Report and Written Opinion for International Application No. PCT/US18/50019 dated Oct. 16, 2018.

* cited by examiner

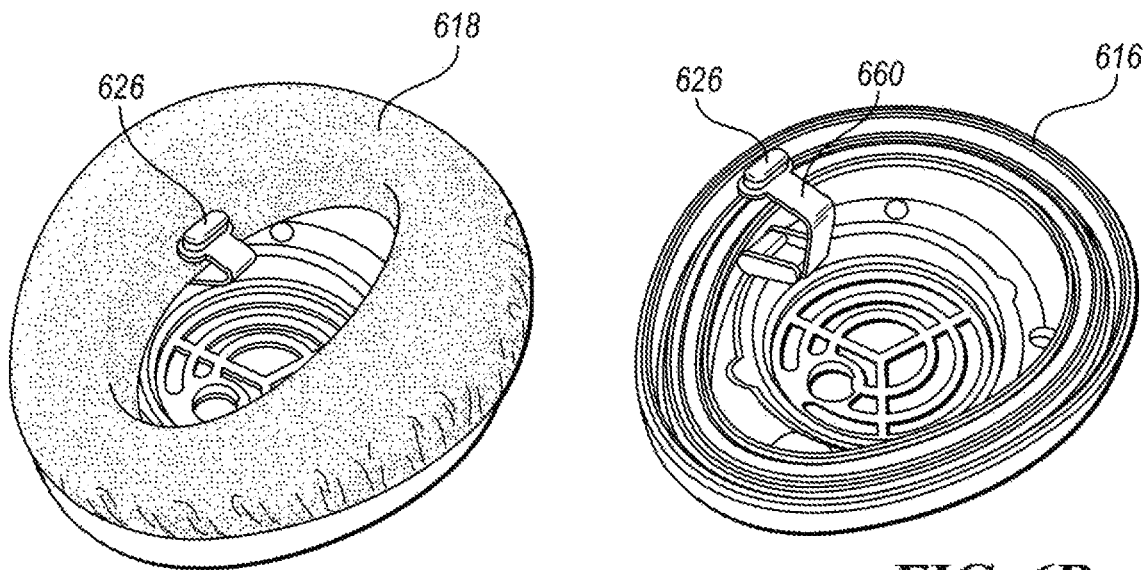
FIG. 6A
FIG. 6B
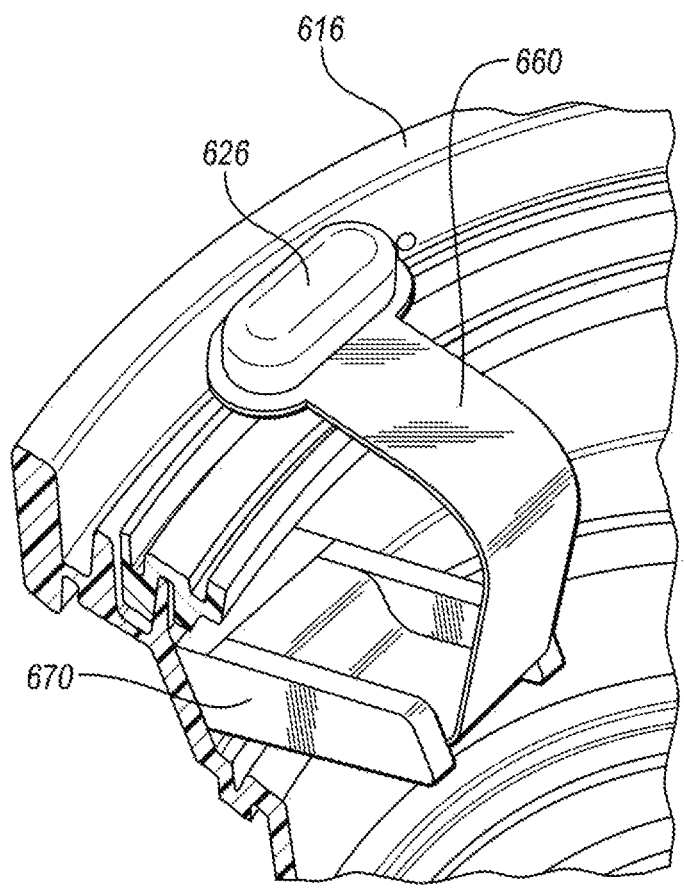
FIG. 6C

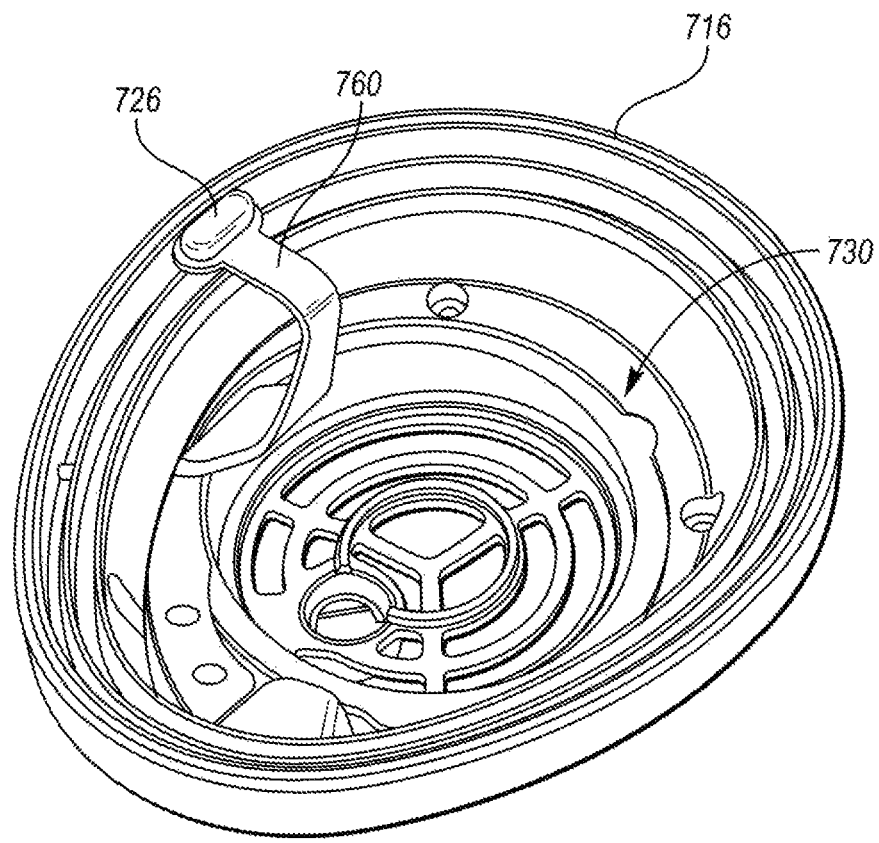
FIG. 7A
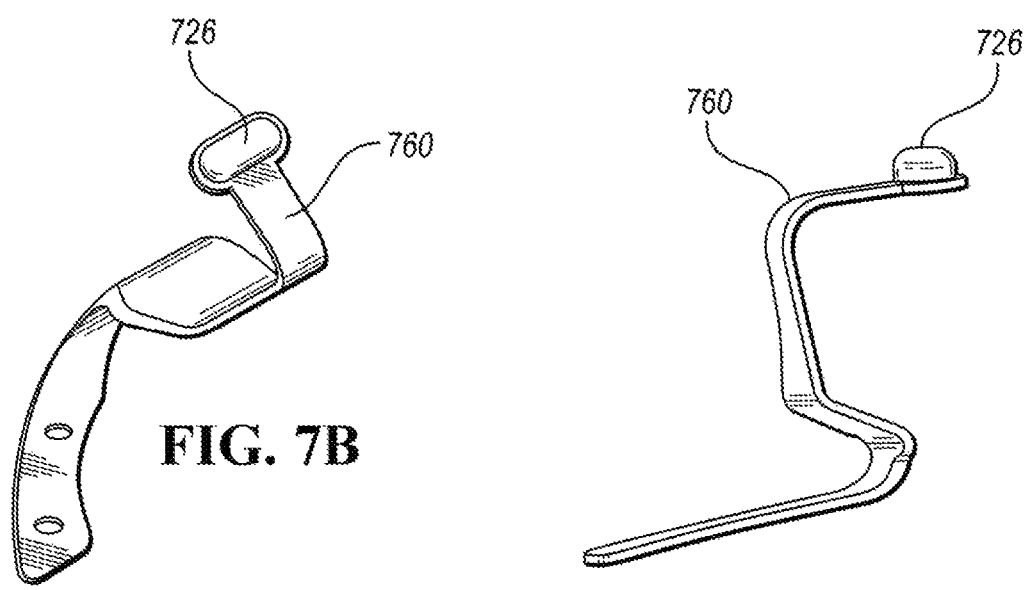
FIG. 7B
FIG. 7C

SENSOR MOUNT AND CIRCUMAURAL HEADSET OR HEADPHONES WITH ADJUSTABLE SENSOR

CROSS-REFERENCE TO RELATED APPLICATIONS

This application is a continuation-in-part of U.S. application Ser. No. 15/697,630 filed Sep. 7, 2017, the disclosure of which is hereby incorporated in its entirety by reference herein.

TECHNICAL FIELD

This disclosure relates to circumaural headphones or earmuffs having an adjustable sensor mount for a biometric or physiological sensor.

BACKGROUND

Various types of sensors are being used to monitor personal physiological or biometric parameters related to health and/or performance during specified events or time periods, as well as during everyday activities. Monitoring of parameters such as heart rate, blood pressure, respiration rate, oxygen saturation, blood chemistry, blood flow, etc. under various environmental and use conditions presents numerous challenges in providing an acceptable sensor signal for processing. For example, motion artifacts generated by movement of the user and/or sensor during use may decrease accuracy of the resulting signal analysis results if not properly accommodated. Similarly, variation in positioning of the sensor relative to an expected placement, or movement during use may result in decreased accuracy. Changes in ambient conditions, such as variations in ambient light, sound, vibration, etc. may also contribute to noise in the sensor signal.

Biometric sensors have been integrated with earphones and headphones as the ear has been identified as being particularly amenable to photoplythysmography (PPG), or the optical volumetric measurement of blood flow, and similar optical measurements. Pulse oximetry sensors have been integrated into the cushion of circumaural headsets to measure blood oxygen saturation. Earphones, ear buds, headphones, and similar devices provide a convenient form factor that users are generally familiar with and comfortable with positioning of the devices.

SUMMARY

In one embodiment, a headset includes a band, first and second circumaural earcup assemblies connected to the band, each earcup assembly comprising an earcup and a cushion, and an adjustable sensor mount configured to be secured to at least one of the cushions. The headset may also include a sensor secured to the adjustable sensor mount, a speaker mounted in at least one of the earcups, a microphone, and a controller in communication with the sensor, the speaker, and the microphone. The controller may be programmed to control the microphone in response to signals from the sensor indicative of user jaw movement. The adjustable sensor mount may include a base configured for sliding engagement with the cushion and a sensor holder secured to the base and configured to receive the sensor. The sensor holder may be pivotably and/or slideably secured to the base. In various embodiments, the sensor holder comprises a support arm having a first end configured to translate in a first direction relative to the base, and a second end configured to receive a housing adapted to secure the sensor in the housing. The second end of the support arm may be configured to engage an inner support adapted to slide within the second end and provide translation of the housing in a direction generally orthogonal to translation of the first end relative to the base.

Embodiments may include a sensor mount with the second end of the support arm pivotally attached to the housing. An elastomeric cover may surround the housing to enhance comfort of the user. The adjustable sensor mount may be configured for sliding along the cushion. The sensor mount base may include a C-shaped base of a resilient plastic or metal adapted to secure the adjustable sensor mount to the cushion.

In one or more embodiments, the headset includes a controller programmed to generate a noise cancelling signal in response to signals from the microphone and to provide the noise cancelling signal to the speaker.

Embodiments also include an after-market or add-on accessory kit for a circumaural headset having a sensor mount configured to be secured to a circumaural cushion of a circumaural headset to position the sensor in contact with a user in front of tragus. The sensor may be installed and connected via a wired or wireless connection to a controller or circuit board of the headset. The sensor mount includes one or more positioning features as described with respect to various headset embodiments.

Various embodiments of a headset or muff having an adjustable sensor mount may include earcups with additional components for active noise reduction (ANR), passive hearing protection, audio, and/or voice communications using wired or wireless technology. ANR applications may include at least one earcup having a driver, error (sense) microphone, an optional voice/speech microphone and/or an optional ambient noise microphone coupled to one or more controllers to provide ANR and voice/speech functions.

The sensor may be mounted on an adjustable mount configured to move the sensor to a desired position on the user and maintain contact between the sensor and the user while delivering a comfortable fit wearing the headset. The controller may be programed to analyze signals from the sensor. In one embodiment, the controller is programmed to detect jaw position and/or movement of the user in response to signals from the sensor. User jaw position and/or movement may be used to infer that a user is talking. The controller may provide a gating signal to a voice/speech microphone in response to detecting that the user is talking such that the voice/speech microphone signal is automatically muted or significantly attenuated when the user is not talking. User jaw position and/or movement as detected by the sensor may also be used to identify other user behavior, such as chewing or yawning, to distinguish from talking, or to provide a local or remote alert, for example.

Embodiments according to this disclosure may provide one or more advantages. For example, adjustable mounting of a sensor within or on a circumaural headset may allow the user to adjust the position of the sensor relative to the headset to improve signal to noise ratio and resulting accuracy and reliability of the sensor signal. The circumaural headset may provide isolation for the sensor to reduce the effect of environmental factors, such as ambient noise and light, on the sensor signals. Resilient mounting of a sensor may improve skin proximity or contact with the sensor during physical activity, while also improving comfort. Positioning of a biometric sensor in contact with the skin in front of the tragus over at least a portion of the TMJ provides a viable location for measurement of various biometric parameters, such as heartrate, oxygen saturation, blood flow, etc. Positioning of the sensor forward of the tragus within a designated target area using a circumaural headset/headphone provides limited location variability from person to person. An adjustable sensor mount according to various embodiments facilitates user adjustment and positioning of the sensor along one or more trajectories using one or more translation and/or rotation axes that may be centrally and/or eccentrically positioned relative to sensor movement. Detection of jaw movement using a sensor may be used to provide an automatic attenuation, muting, or gating function for a communication microphone associated with the headset, or to provide local or remote alerts based on inferred behavior associated with jaw position or movements.

The above advantages and other advantages and features will be readily apparent from the following detailed description of the preferred embodiments when taken in connection with the accompanying drawings.

BRIEF DESCRIPTION OF THE DRAWINGS

FIGS. 6A-6C illustrate an earcup assembly and a side-mounted adjustable support arm for a sensor according to one or more embodiments;

FIGS. 7A-7C illustrate an earcup assembly and a flat-mounted adjustable support arm for a sensor according to one or more embodiments;

DETAILED DESCRIPTION

As required, detailed embodiments are disclosed herein; however, it is to be understood that the disclosed embodiments are merely representative and the claimed subject matter may be embodied in various and alternative forms not explicitly illustrated or described. The figures are not necessarily to scale; some features may be exaggerated or minimized to show details of particular components. Therefore, specific structural and functional details disclosed are not to be interpreted as limiting, but merely as a representative basis for teaching one skilled in the art to variously employ the claimed subject matter.

Figure 1:
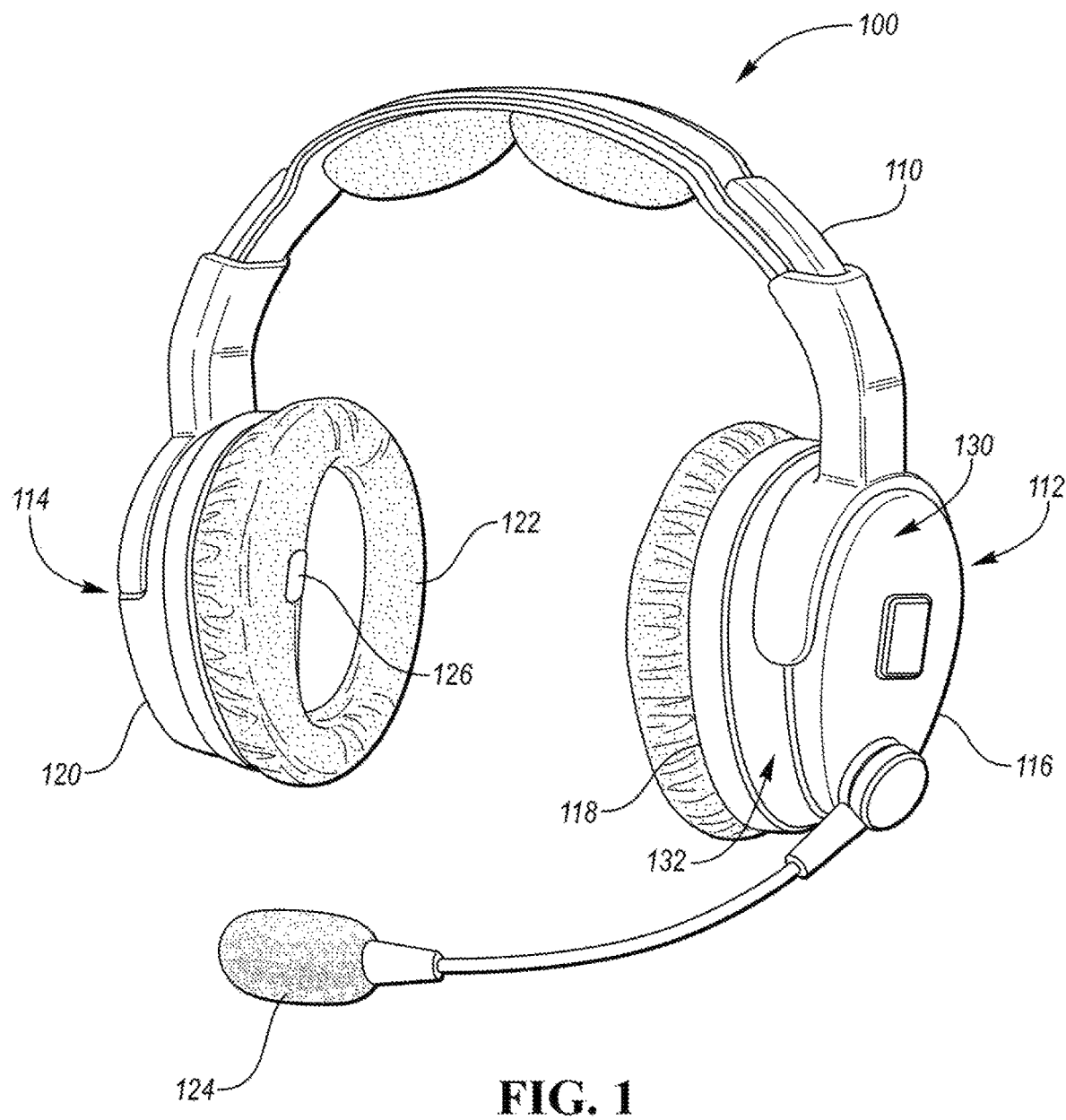
FIG. 1 illustrates a representative circumaural headset having an adjustable sensor mount according to one or more embodiments.

FIG. 1 illustrates a representative circumaural headset having an adjustable biometric sensor mount according to one or more embodiments. Headset 100 includes a band 110 connecting first circumaural earcup assembly 112 and second circumaural earcup assembly 114. Each earcup assembly 112, 114 includes an associated earcup 116, 120 and cushion 118, 122. Each earcup 116, 120 includes a bottom portion 130 and a circumaural side portion 132. Headset 100 may include a microphone 124, which is implemented by a wired boom microphone in the representative embodiment illustrated. In other embodiments, headset 100 may communicate with an associated wireless microphone or with a wireless device having a microphone. When included, a microphone may be implemented with or without a boom, on a short boom, integrated into a wired connection, implemented by an optical comparator system, etc. Some embodiments do not include an associated microphone.

Headset 100 includes at least one sensor 126 secured to an adjustable sensor mount, which is secured to at least one of the first 112 and second 114 circumaural earcup assemblies. Various representative embodiments are described with reference to a biometric or physiological sensor. However, those of ordinary skill in the art will recognize that sensor 126 may be implemented by various types of sensors that may employ chemical, electrical, and/or optical technology to provide detection or measurement of various environmental conditions as well as user characteristics and/or movements. As such, the representative embodiments described and illustrated are not limited to biometric or physiologic sensors. Other examples of sensors may include acoustic sensors, accelerometers, and gyroscopes, for example.

As described in greater detail below, the adjustable sensor mount is configured to be movable in at least one direction or dimension to adjust a position of the sensor 126 relative to the earcup assembly 114 to position the sensor within a target region 210 (FIG. 2) of the user, either in contact with the user or near contact, such as within 0-5 mm of the user, for example. In various embodiments, the target area or region 210 is generally forward of a tragus of the user as generally indicated in the ear anatomy of FIG. 2, and may extend above or below the tragus. In one or more embodiments, target region 210 extends between 5 mm-50 mm in front of the tip of the tragus, and within 25 mm above the helix to 25 mm below the ear lobe (or lobule of the ear).

For embodiments employing a biometric or physiologic sensor, sensor 126 may be implemented by any of a number of commercially available sensors that may be used to provide signals indicative of physiological parameters or characteristics of the user/wearer such as heart rate, blood pressure, respiration rate, oxygen saturation, blood chemistry, blood flow, etc. In one embodiment, signals from a biometric sensor 126 are used to detect jaw position and/or movement of the user that may indicate talking, chewing, yawning, etc. Jaw position signals may be used to provide a gating signal to provide an automatic muting function for microphone 124 that mutes microphone 124 except when the user is talking. In one or more implementations of a jaw position or movement sensor, biometric sensor 126 may be implemented by one or more accelerometers and/or gyroscopes, for example.

Figure 2:
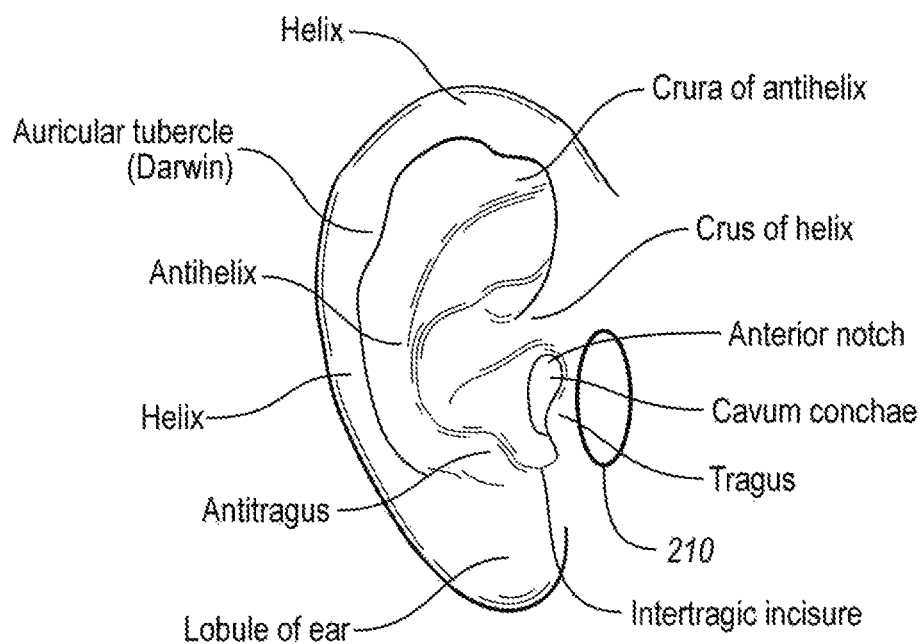
FIG. 2 illustrates ear anatomy with a target area forward of the tragus over at least a portion of the temporomandibular joint (TMJ) for positioning of a sensor of a circumaural headset according to one or more embodiments.

FIG. 2 illustrates ear anatomy with a target area 210 forward of the tragus over at least a portion of the temporomandibular joint (TMJ) for positioning of a biometric sensor 126 of a circumaural headset according to one or more embodiments. As used throughout this description, an adjustable sensor mount provides movement of the sensor relative to the earcup assembly in at least one direction. In some embodiments, movement may be provided in non-orthogonal directions, or along one or more of an x-axis, y-axis, and z-axis direction where the x-axis is defined by moving forward in the direction of the face or rearward in the direction of the back of the head (horizontally), the y-axis is defined by moving in the direction of the top of the head (upward) or the neck (vertically, downward), and the z-axis is defined by moving toward the head or away from the head. Similarly, depending on the particular application and implementation, biometric sensor 126 may be mounted to move along a two-dimensional or three-dimensional trajectory according the degrees of freedom of the particular mounting mechanism or device. For example, combination movements incorporating rotation and translation about one or more axes symmetrically or asymmetrically (or eccentrically) positioned axes may be used to provide three-dimensional movement of the biometric sensor 126, such as toward the head while moving upward and forward, or away from the head while moving forward and downward. Numerous other movement trajectories are possible.

Figure 3:
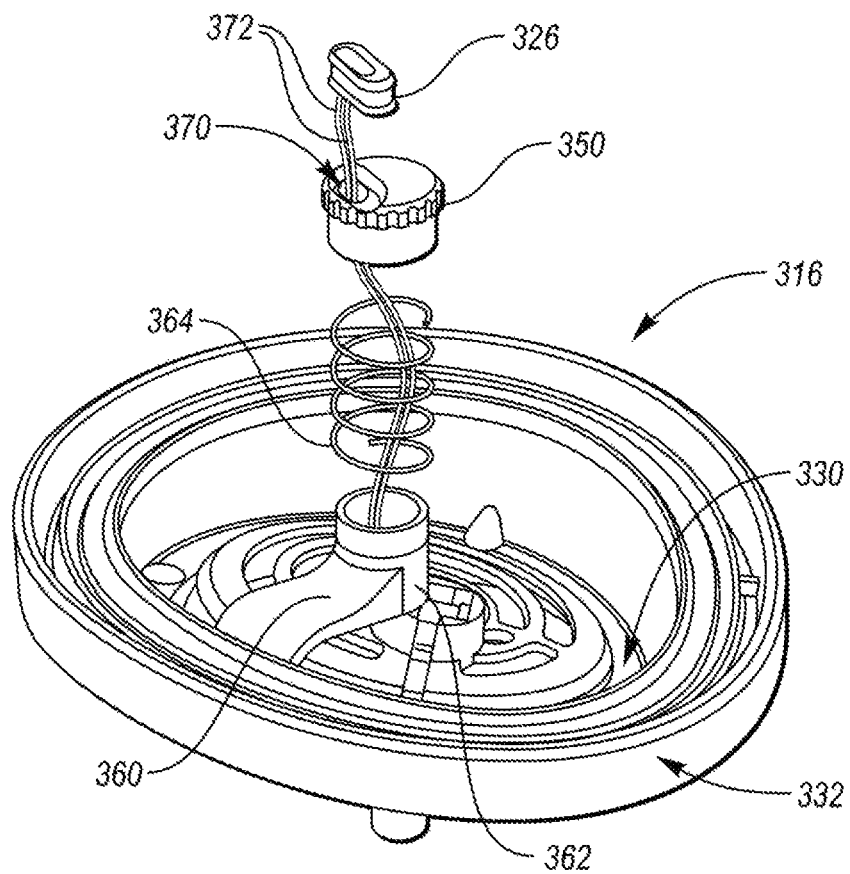
FIG. 3 is an assembly view of a representative earcup having a sensor eccentrically mounted on a spring-biased adjustment knob supported from an interior side surface of an earcup assembly according to one or more embodiments.

FIG. 3 is an assembly view of a representative earcup 316 having a biometric sensor 326 eccentrically mounted on a spring-biased adjustment knob or cap 350 supported from an interior side surface 332 of the earcup 316 according to one or more embodiments. As used throughout this description, references to a spring, spring-biased, or resilient component or device are meant to be broadly construed and refers generally to an elastic component or device that recovers its original shape when released after being distorted. A sensor mount supported from a side surface of the earcup assembly may provide various advantages including improved repeatability and reliability of sensor placement and position/contact relative to the user, as well as providing user comfort along the z-axis. Sensor (or support) arm 360 extends from an interior side surface 332 and supports base 362. Interior side surface 332 may be an interior side surface of the earcup 316 or another component within the earcup assembly generally orthogonal to the head of the user. Alternatively, support arm 360 may extend from a flat surface 330 of the earcup 316 or the earcup assembly that is generally parallel to the head of the user. For example, support arm 360 may extend from a speaker plate secured to the earcup as illustrated in FIG. 7.

Support arm 360 and base 362 may be integrally formed or molded with earcup 316 in some embodiments. Support arm 360 may be flexible or resilient to urge biometric sensor 326 into contact with the headset user. In one embodiment, support arm 360 may be repositionable around the circumference of the earcup, or at least a portion of the circumference of the earcup. Alternatively, or in combination, a spring 364 may be disposed within or around base 362 with cap 350 rotatably secured to base 362 over spring 364 and moveable against a spring force of spring 364 toward base 362. Cap 350 includes an eccentrically located aperture 370 configured to receive and secure biometric sensor 326. In the representative embodiment illustrated, biometric sensor 326 is implemented by a wired sensor with wires 372 communicating with a controller (FIG. 8). Wired sensors may be configured for permanent or removeable connection to a controller or circuit board by a plug, ribbon cable connector, soldering, etc. depending on the particular application. Various embodiments may be configured adapted to receive an add-on biometric sensor 326 that may be installed on a headset and connected to a controller as described in greater detail herein. Biometric sensor 326 may also be implemented by a wireless sensor depending on the particular application. For applications having a wired biometric sensor 326, cap 350 and base 362 may include complementary grooves with stops to limit rotation of cap 350 to less than 360 degrees to reduce twisting of wires 372.

In some embodiments, cap 350 and base 362 may include complementary threads or grooves to move or adjust sensor 326 along the z-axis with resistance provided by spring 364 to maintain a particular rotational position. In these embodiments, biometric sensor 326 may be centrally located within cap 350. In other embodiments, a slot or groove in base 362 may cooperate with a corresponding or complementary protrusion within cap 350 to secure cap 350 to base 362 and limit movement along the z-axis. Spring 364 resiliently biases cap 350 to extend from base 362 along the z-axis into contact with the headset user. In these embodiments, rotation of the cap 350 and eccentrically mounted sensor 326 may be used to better locate or position the sensor in the x-axis and y-axis directions with respect to the target area or region forward of the tragus of the user generally over a portion of the TMJ.

Figure 4A:
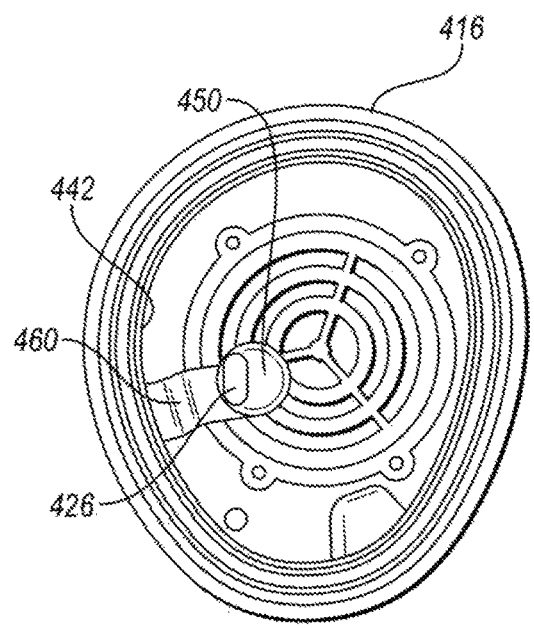
FIGS. 4A and 4B illustrate an earcup assembly having a side-mounted support arm and base for an adjustable sensor without the cushion, and with the cushion installed, respectively, according to one or more embodiments.
Figure 4B:
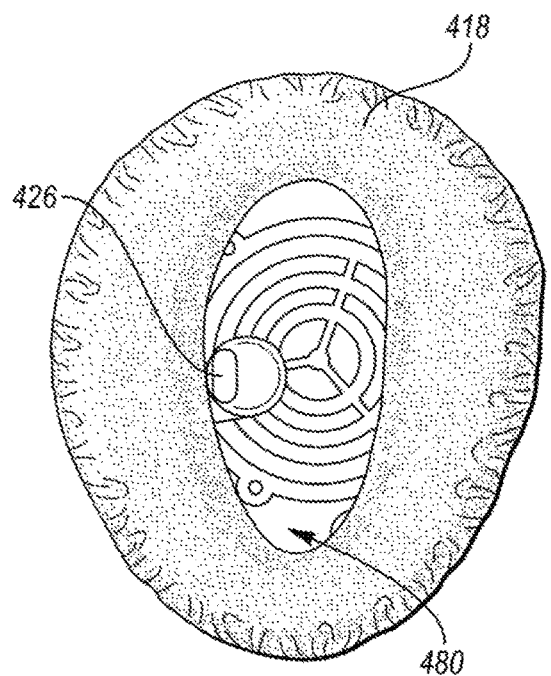

FIGS. 4A and 4B illustrate an earcup 416 having a side-mounted support arm 460 and base for an adjustable biometric sensor 426 without the cushion 418, and with the cushion 418 installed, respectively, according to one or more embodiments. As previously described, sensor 426 may be eccentrically mounted on a rotatable cap 450 secured to a base (not shown) supported by support arm 460, which extends from an interior side surface 442 of earcup 416. As shown in FIG. 4B, support arm 460 positions sensor 426 within the opening 480 of cushion 418. In other embodiments, sensor 426 may at least partially overlap a side portion of cushion 418. Support arm 460 may be mounted to slide along an interior guide or rail within earcup 416 in some embodiments.

Figure 5A:
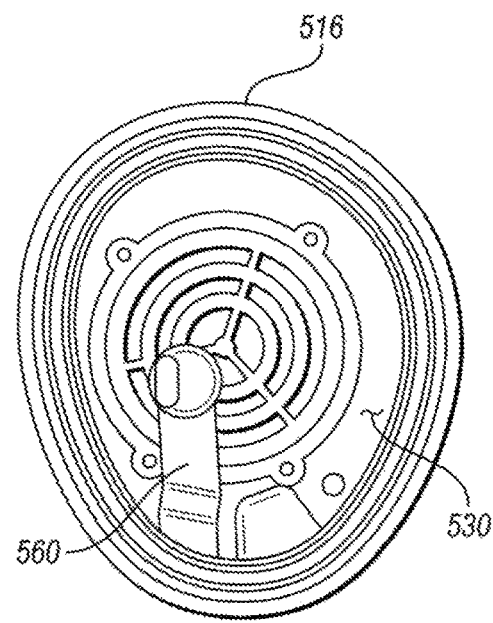
FIGS. 5A and 5B illustrate an earcup assembly having a flat-mounted support arm extending from a flat surface of the earcup assembly for an adjustable sensor without the cushion, and with the cushion installed, respectively, according to one or more embodiments.
Figure 5B:
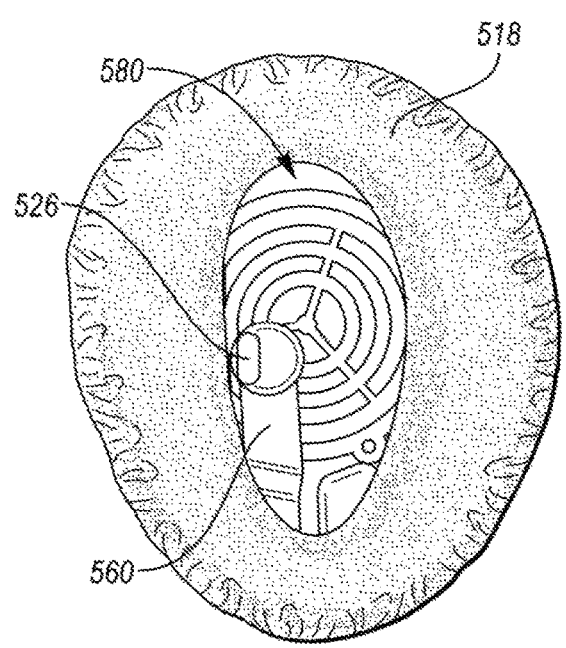

FIGS. 5A and 5B illustrate an earcup 516 having a flat-mounted support arm 560 extending from a flat surface 530 of the earcup assembly for an adjustable biometric sensor without the cushion 518, and with the cushion 518 installed, respectively, according to one or more embodiments. As previously described, flat surface 530 may be a flat surface of the earcup or a component mounted within the earcup, such as a speaker plate or similar component, for example. In some embodiments, support arm 560 is moveable around at least a portion of the interior of earcup 516. Support arm 560 is configured to position biometric sensor 526 within opening 580 of circumaural cushion 518.

FIGS. 6A-6C illustrate an earcup 616 and a side-mounted adjustable support arm 660 for a biometric sensor 626 according to one or more embodiments. FIG. 6A illustrates positioning of biometric sensor 626 within an opening in cushion 618. As shown in FIGS. 6B and 6C, biometric sensor 626 is mounted on a spring arm 660, which is secured by a lateral support 670. In some embodiments, lateral support 670 may be movable around the interior of earcup 616 to position biometric sensor 626 in the x-axis and y-axis directions. Movement of biometric sensor 626 in the z-axis direction is provided by spring arm 660.

FIGS. 7A-7C illustrate an earcup 716 and a flat-mounted adjustable support arm 760 for a biometric sensor 726 according to one or more embodiments. Support arm 760 is mounted on a flat surface 730 of earcup 716 or another component mounted within the earcup assembly. Flat surface 730 may be a bottom surface of earcup 716, or a speaker plate, for example. Flat surface 730 may be generally parallel to the user's head, or alternatively at an angle, such as less than 45 degrees relative to parallel. Support arm 760 may be made of a resilient material to provide a spring force that urges biometric sensor 726 into contact with the user when the headset is worn. As described with respect to other embodiments, and generally applicable to all embodiments, any adjustments that facilitate positioning of the sensor within the target region in contact with the user may also provide positioning within the target region in near contact with the user, such as within 0-5 mm, for example. Similar to the side-mounted embodiments illustrated in FIGS. 6A-6C, some embodiments of a flat-mounted adjustable support arm have the support arm 760 movable around at least a portion of flat surface 730 to provide adjustments in the x-axis and y-axis directions. Movement of biometric sensor 726 in the z-axis direction may be provided by the resilient support arm 760.

Figure 8A:
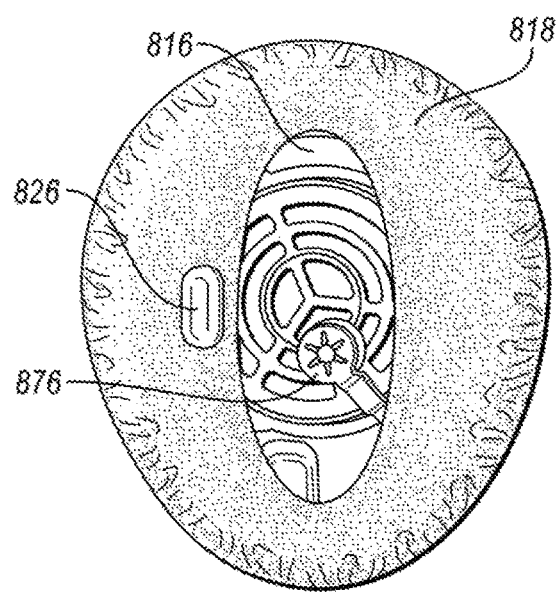
FIGS. 8A-8D illustrate an earcup assembly and cushion having an adjustable sensor integrated with the cushion according to one or more embodiments.
Figure 8B:
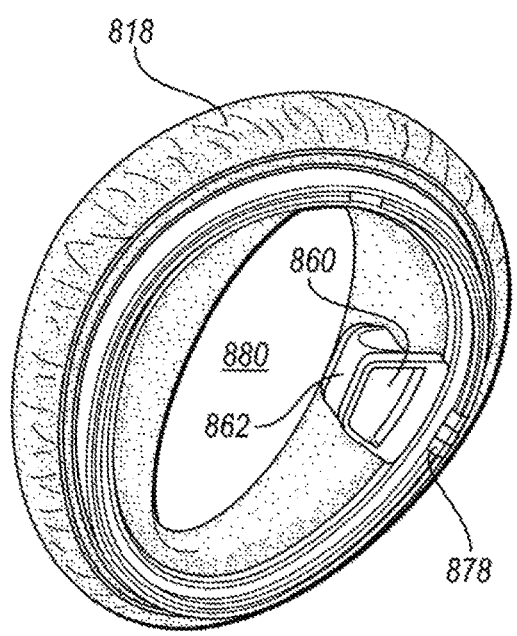
Figure 8C:
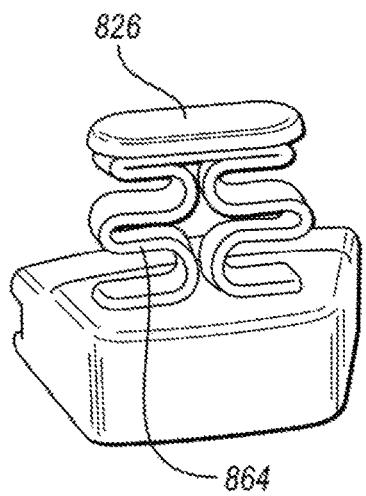
Figure 8D:
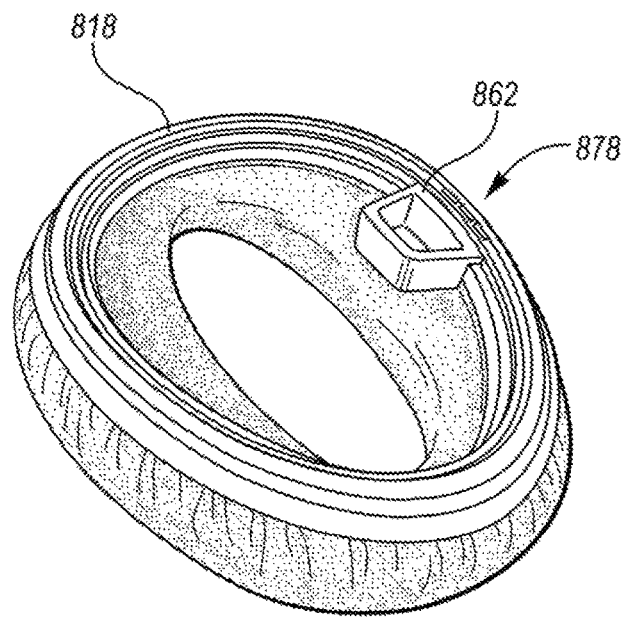
Figure 11:
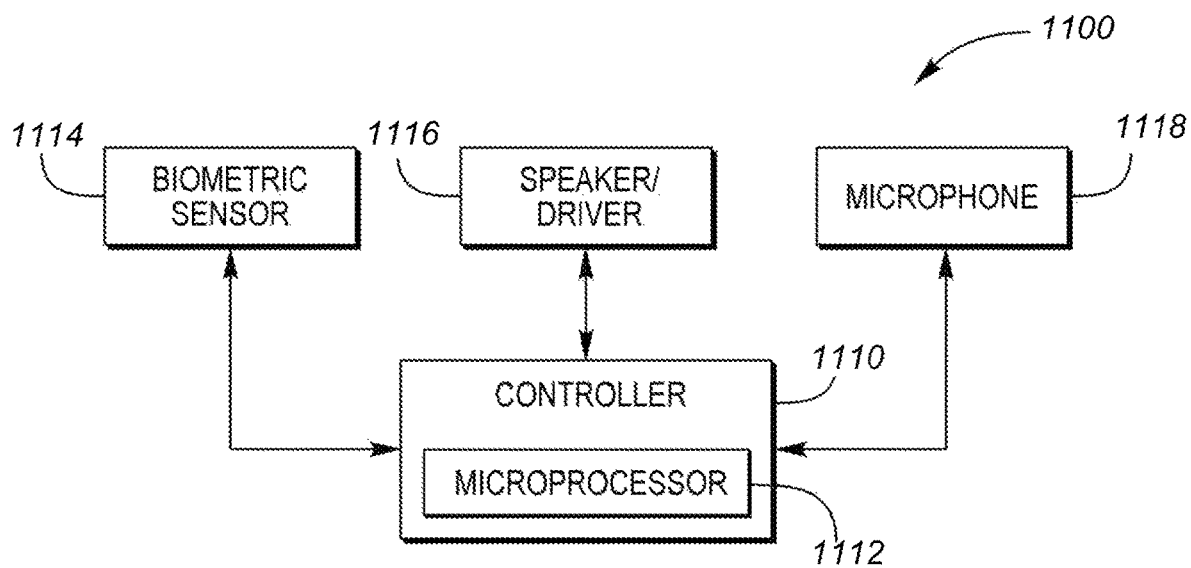
FIG. 11 is a block diagram illustrating operation of a representative control system for a circumaural headset having an adjustable sensor according to one or more embodiments.

FIGS. 8A-8D illustrate an earcup 816 and cushion 818 having an adjustable biometric sensor 826 integrated with the cushion 818 according to one or more embodiments. FIG. 8A also illustrates representative placement of a speaker/driver 876. As shown in the underside view of FIG. 8B, a support arm 860 extends from a side of the cushion seal and supports a base 862. In this embodiment, base 826 extends through cushion 818 rather than being positioned within circumaural opening 880. Electrical contacts 878 may be provided to connect biometric sensor 826 to a controller (FIG. 11). As shown in FIG. 8C, the adjustable sensor mount may include an integrally molded spring 864 implemented by first and second serpentine springs in this example. Spring 864 may be implemented as a coil spring or in any other manner depending on the particular application. Biometric sensor 826 extends through cushion 818 and may be generally flush with the cushion surface or extend slightly beyond the cushion surface when the cushion is not compressed.

Figure 9:
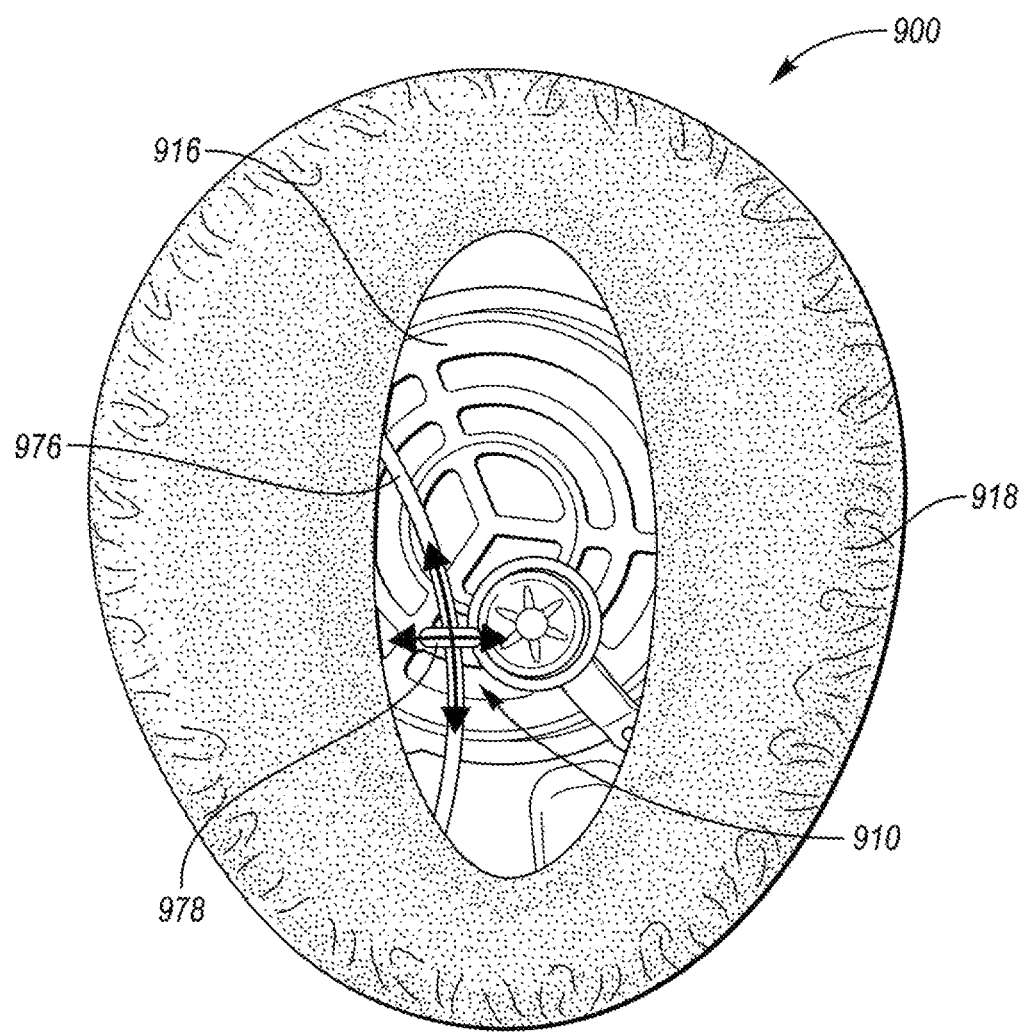
FIG. 9 illustrates an earcup assembly having a rack-on-rack adjustment support for a sensor according to one or more embodiments.

FIG. 9 illustrates an earcup assembly 900 having a rack-on-rack adjustment support 910 for a biometric sensor according to one or more embodiments. Rack-on-rack adjustment support 910 includes an arcuate rack 976 mounted within earcup 916 generally behind or below a front surface of cushion 918. A transverse rack 978 engages arcuate rack 976 and is slidable relative thereto. Arcuate rack 976 may include teeth or similar detents that allow transverse rack 978 to move or slide along arcuate rack with sufficient force, while holding transverse rack 978 in a selected position when sufficient force is not applied. Transverse rack 978 may also include teeth on a top surface to engage the base of the sensor mount (best illustrated in FIGS. 3-5) allowing the base to slide along transverse rack 978 in a similar fashion.

Figure 10A:
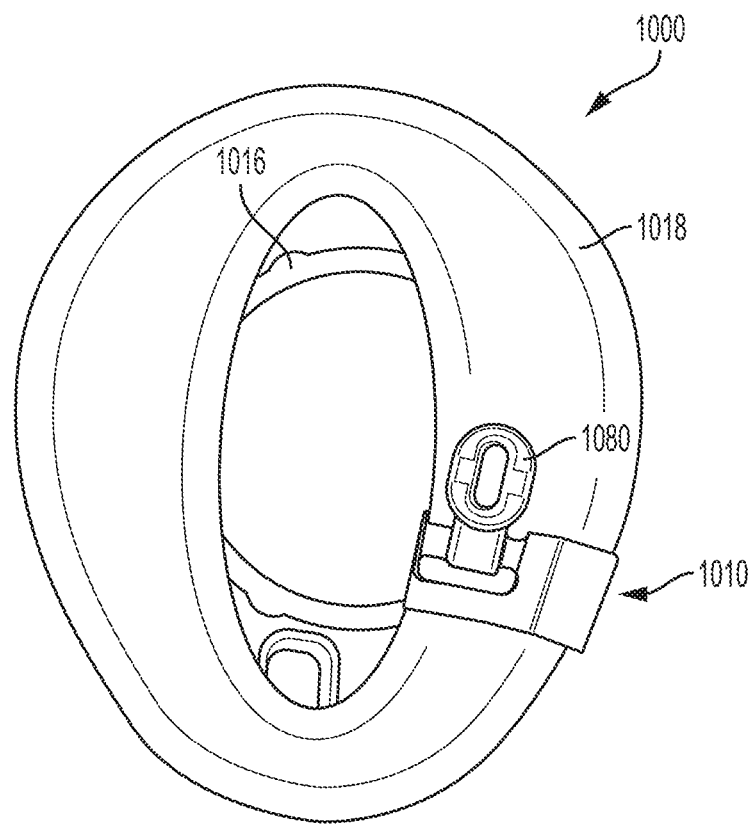
FIGS. 10A and 10B illustrate a sensor mount configured to engage the cushion of an earcup assembly according to one or more embodiments.
Figure 10B:
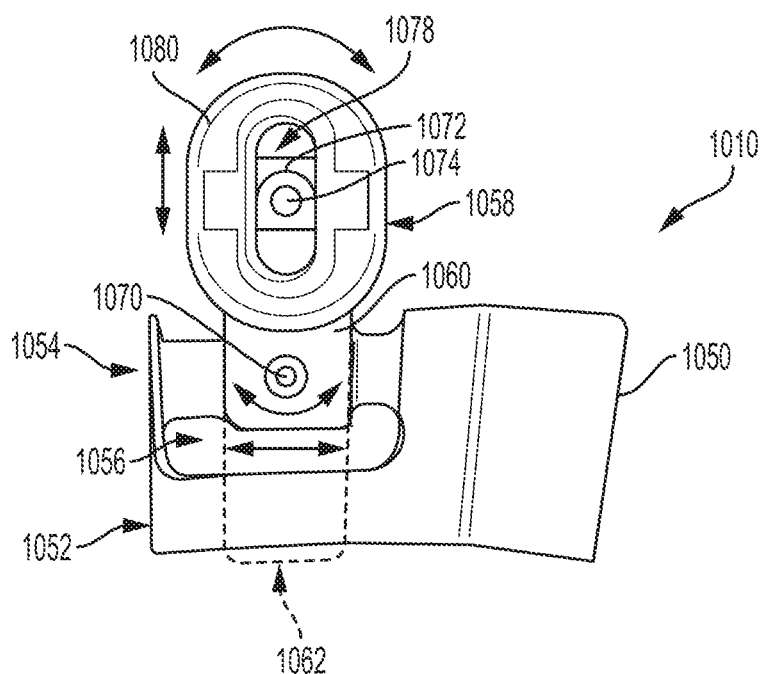

Another embodiment of a biometric sensor mount for a circumaural headset is illustrated in FIGS. 10A and 10B. Earcup assembly 1000 includes a sensor mount 1010 configured to attached to cushion 1018, which is secured to earcup 1016. Sensor mount 1010 includes a strap or base 1050 that may be constructed of a resilient material, such as a resilient plastic or metal, to securely position a strap or base 1050 relative to cushion 1018. Alternatively, strap or base 1050 may be constructed of a flexible or deformable material that may be bent by the user to secure the base 1050 to the cushion 1018 at a desired position. Base 1050 may be configured as a generally U-shaped or C-shaped device extending across the surface of cushion 1018 and at least partially around a back side of cushion 1018 to secure sensor mount 1010 thereto. In various embodiments, base 1050 is configured to slide relative to cushion 1018 so that a sensor (not shown) secured to sensor holder 1058 may be appropriately positioned in front of the tragus of the user.

Base 1050 may include integrated extension portions 1052, 1054 defining a slot or aperture 1056 therebetween. Sensor mount 1010 may include an arm 1060 that may cooperate with at least one of the extensions 1052, 1054 to facilitate sliding or translating of sensor holder 1058 along at least a portion of base 1050 in a direction generally transverse to sliding movement of base 1050 along cushion 1018. In various embodiments, arm 1060 may cooperate with both extensions 1052, 1054 as indicated at 1062. Arm 1060 may include a first pivot 1070 to facilitate rotational movement of arm 1060 relative to base 1050. Similarly, arm 1060 may include an inner support 1072 that may slide or translate within a corresponding outer support of arm 1060 so that sensor holder 1058 can translate relative to arm 1060. Inner support 1072 may include an associated pivot attachment 1074 to secure sensor holder 1058 to inner support 1072 and allow rotational movement of sensor holder 1058.

Sensor holder 1058 may include a rigid housing made of plastic or metal, for example defining an opening 1078. An elastomeric cover 1080 may surround the housing to improve user comfort while maintaining an associated biometric sensor (not shown) positioned within opening 1078 in contact with a user generally forward of the tragus of the user. The resiliency of the cushion 1018 may be used to keep any installed sensor in contact with, or in close proximity to, the user. When installed, the sensor (not shown) may be connected to an associated controller or processor by a wired or wireless connection as generally described herein.

Various embodiments may include an after-market or add-on accessory kit for a circumaural headset having a sensor mount 1010 including one or more of the positioning features described with respect to FIGS. 10A and 10B. A sensor may be installed within sensor holder 1058 and connected to an existing headset via a plug, ribbon cable, etc. connected to a corresponding circuit board or similar interface. Alternatively, the sensor may be coupled to a headset processor or controller via a wireless connection using BLUETOOTH, BLE, or similar technology. As previously described, sensor mount 1010 may secure various types of sensors including, but not limited to, biometric or physiologic sensors, accelerometers, gyroscopes, etc. that may use electrical and/or optical technology, for example.

FIG. 11 is a block diagram illustrating operation of a representative control system for a circumaural headset having an adjustable biometric sensor according to one or more embodiments. System 1100 includes a controller 1110, which may include a processor 1112. As those of ordinary skill in the art will recognize, a controller 1110 may refer to software and/or hardware that cooperate to provide control of the system. Controller 1110 and/or processor 1112 may be implemented by general purpose or special purpose processors, chips, or microcontrollers, that may include one or more programmable circuits, elements, microprocessors, etc., such as digital signal processors (DSPs), FPGAs, and ASICs, for example. Controller 1110 communicates with biometric sensor 1114, speaker/driver 1116, and microphone 1118 via wired and/or wireless communication. Controller 1110 may be programmed to perform various functions, features, or algorithms as generally described herein and as represented by flow charts or similar diagrams such as shown in FIG. 12.

Figure 12:
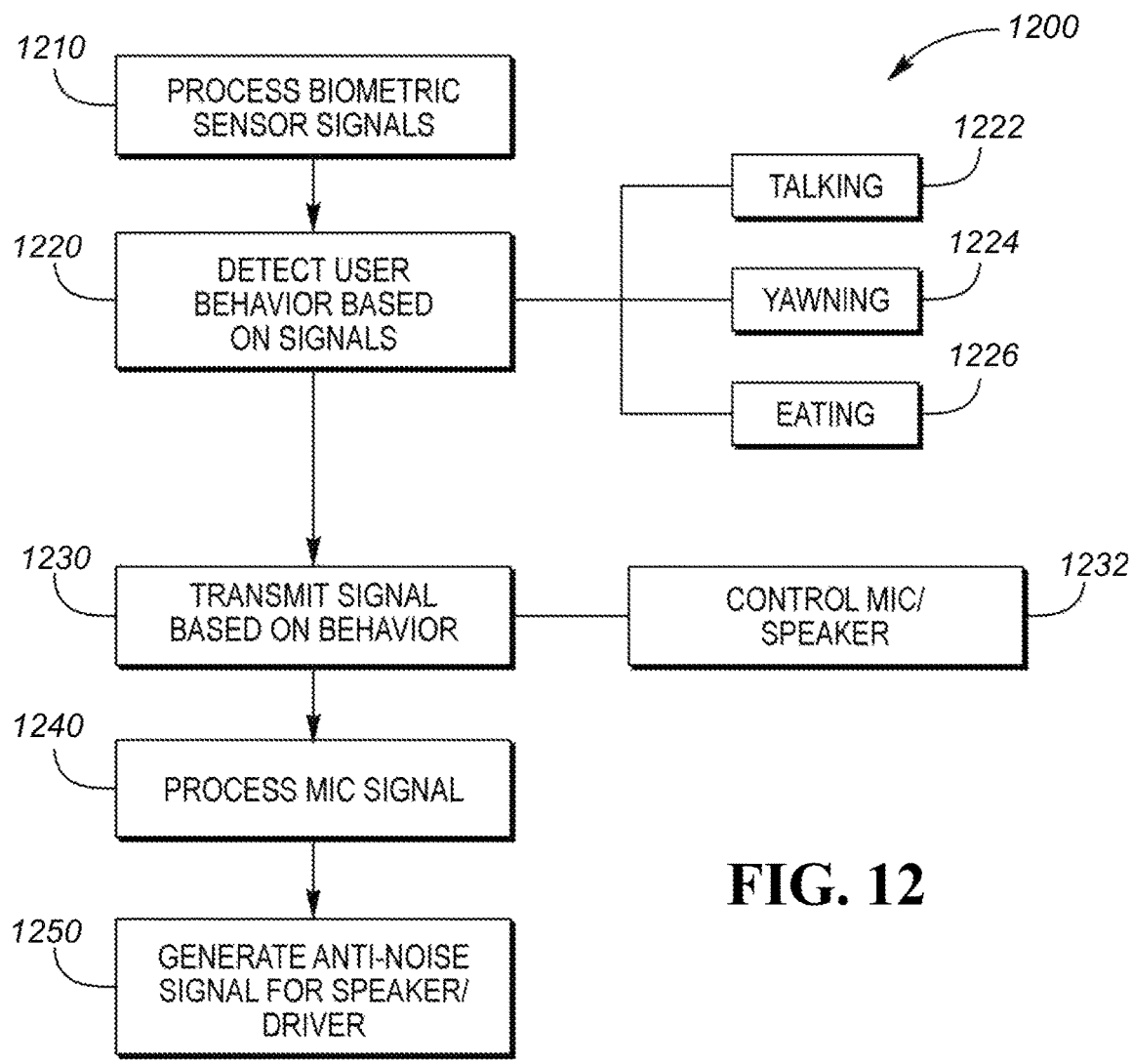
FIG. 12 is a flowchart illustrating operation of a system or method for controlling a circumaural headset having an adjustable sensor according to one or more embodiments.

FIG. 12 is a flowchart 1200 illustrating operation of a system or method for controlling a circumaural headset having an adjustable biometric sensor according to one or more embodiments. The flowchart provides representative control strategies and/or logic that may be implemented using one or more processing strategies such as event-driven, interrupt-driven, multi-tasking, multi-threading, and the like. Various control strategies including, but not limited to, open-loop, closed-loop, adaptive, feedback, feedforward, and hybrid strategies may be implemented by control logic, functions, or software executed by controller 1110 to provide active noise reduction, processing of sensor signals to monitor conditions and/or movements of the user, environmental or ambient conditions, and/or processing or analysis of sensor signals to provide an alert or control signal to a local or remote device, such as a microphone or speaker, in various embodiments. Alternatively, sensor data may be transmitted for storage and/or processing at a remote computer, server, or cloud device, for example.

Various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based controller represented by controller 1110 and microprocessor 1112. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a processor to perform the described function or feature. The computer-readable storage devices or media may include one or more of a number of known physical devices which utilize electric, magnetic, and/or optical storage to keep executable instructions and associated information, operating variables, and the like.

Block 1210 represents processing of signals received from a biometric sensor. Signals may be received by a wire connecting the sensor to the processor, or via wireless communication. Signal processing may be performed to monitor one or more physiological parameters of the headset user, which may be stored in a computer readable storage associated with the controller. Sensor signals from the biometric sensor may also be processed and analyzed to detect user jaw position and/or movement and infer an associated user behavior based on the signals as represented at block 1220. For example, jaw position or movement may be analyzed to infer that a user is talking as represented at block 1222, yawning as represented at block 1224, or eating as represented at block 1226.

A signal may be generated in response to detected user behavior and transmitted locally or remotely as represented at block 1230. The signal may be used to control an associated microphone or speaker as represented at block 1232. In one embodiment, biometric sensor signals are processed to detect user jaw position and/or motion indicative of talking with the resulting signal used to provide a gating signal or automatic muting feature for an associated microphone. This is particularly advantageous in noisy environments where automatic muting based on ambient noise levels may lead to spurious unmuting of the microphone. In some embodiments, the signal may be used as a gating signal internally within the controller or processor.

In some embodiments, one or more microphones may be used to monitor ambient noise to provide active noise reduction (ANR). In these embodiments, a microphone signal is processed as represented at block 1240 to generate an anti-noise signal out of phase with the noise, and apply the anti-noise signal to an associated speaker/driver as represented at block 1250.

As apparent from the representative embodiments illustrated, the x-axis and y-axis adjustments can be made by a user adjusting the location of the sensor along a predefined area, either via an adjustable arm that can move along the x-axis, y-axis, along a rack or rail in the x-y plane, or in an eccentric pattern to provide vertical and horizontal or rotational adjustments. The movement along the axes may involve the entire sensor assembly along the side or flat surface of the earcup. Alternatively, or in combination, the movement may involve parts of the assembly, such as the sensor mount, along a track or adjustable surface. For embodiments having the sensor integrated within the cushion, the x-axis and y-axis adjustment is primarily accomplished by adjustment of the headset on the user's head to locate the sensor appropriately. Alternatively, different foam inserts may be provided each having different sensor placement within the cushion to customize the placement for a particular user.

The z-axis adjustment is limited in user interaction and can be provided by a spring, flexible arm, or foam pieces used individually or in combination to optimize skin contact, sensor readings, and comfort. The z-axis adjustments account for the ergonomics of the range of heads and the compressibility of the cushion to allow for a proper range of adjustments to be made to optimize skin contact, sensor readings, and comfort.

As demonstrated by the representative embodiments illustrated and describe in this disclosure, one or more advantages may be provided. For example, adjustable mounting of a biometric sensor within a circumaural headset may allow the user to adjust the position of the sensor relative to the headset to improve signal to noise ratio (SNR) and resulting accuracy and reliability of the sensor signal. The circumaural headset may provide isolation for the biometric sensor to reduce the effect of environmental factors, such as ambient noise and light, on the sensor signals. Resilient mounting of a biometric sensor may improve skin contact with the sensor during physical activity, while also improving comfort. Positioning of a biometric sensor in contact with the skin in front of the tragus over at least a portion of the TMJ provides a viable location for measurement of various biometric parameters, such as heartrate, oxygen saturation, blood flow, etc. In addition, positioning of the sensor forward of the tragus using a circumaural headset/headphone provides limited location variability from person to person. An adjustable biometric sensor mount according to various embodiments facilitates user adjustment and positioning of the sensor in two dimension for proper placement with a third-dimension adjustment for comfort and proper skin contact. Detection of jaw movement using a biometric sensor may be used to provide an automatic muting or gating function for a communication microphone associated with the headset, or to provide local or remote alerts based on inferred behavior associated with jaw position or movements.

While representative embodiments are described above, it is not intended that these embodiments describe all possible forms of the claimed subject matter. The words used in the specification are words of description rather than limitation, and it is understood that various changes may be made without departing from the spirit and scope of the disclosure. Additionally, the features of various implementing embodiments may be combined to form further embodiments that may not be illustrated or described in combination. While the best mode has been described in detail, those familiar with the art will recognize various alternative designs and embodiments within the scope of the following claims. While various embodiments may have been described as providing advantages or being preferred over other embodiments with respect to one or more desired characteristics, those of ordinary skill in the art will recognize that one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. Any embodiments described as less desirable than other embodiments or prior art implementations with respect to one or more characteristics are not outside the scope of the disclosure and may be desirable for particular applications.

What is claimed is:

1. A headset comprising:
a band;
first and second circumaural earcup assemblies connected to the band, each earcup assembly comprising an earcup and a cushion;
an adjustable sensor mount configured to be secured to at least one of the cushions and comprising a base configured for sliding engagement with the cushion and a sensor holder secured to the base and configured to receive the sensor, wherein the sensor holder comprises a support arm having a first end configured to translate in a first direction relative to the base, and a second end configured to receive a housing adapted to secure the sensor in the housing, wherein the second end is pivotally attached to the housing;
a sensor secured to the adjustable sensor mount;
a speaker mounted in at least one of the earcups;
a microphone; and
a controller in communication with the sensor, the speaker, and the microphone.

2. The headset of claim 1 wherein the controller is programmed to automatically unmute the microphone in response to signals from the sensor indicative of a user talking, and mute the microphone otherwise.

3. The headset of claim 1 wherein the sensor holder is pivotably secured to the base.

4. The headset of claim 1 wherein the sensor holder is configured to slide relative to the base.

5. The headset of claim 1 further comprising an elastomeric cover surrounding the housing.

6. The headset of claim 1 wherein the adjustable sensor mount is configured for sliding along the cushion.

7. The headset of claim 6 wherein the adjustable sensor mount comprises a C-shaped base adapted to secure the adjustable sensor mount to the cushion.

8. The headset of claim 1 wherein the controller is programmed to generate a noise cancelling signal in response to signals from the microphone and to provide the noise cancelling signal to the speaker.

9. A headset comprising:
a band;
first and second circumaural earcup assemblies connected to the band, each earcup assembly comprising an earcup and a cushion;
an adjustable sensor mount configured to be secured to at least one of the cushions and comprising a base configured for sliding engagement with the cushion and a sensor holder secured to the base and configured to receive the sensor, wherein the sensor holder comprises a support arm having a first end configured to translate in a first direction relative to the base, and a second end configured to receive a housing adapted to secure the sensor in the housing, wherein the second end of the support arm is configured to engage an inner support adapted to slide within the second end and provide translation of the housing in a direction generally orthogonal to translation of the first end relative to the base;
a sensor secured to the adjustable sensor mount;
a speaker mounted in at least one of the earcups;
a microphone; and
a controller in communication with the sensor, the speaker, and the microphone.

10. The headset of claim 9 wherein the controller is programmed to automatically unmute the microphone in response to signals from the sensor indicative of a user talking, and mute the microphone otherwise.

11. The headset of claim 9 wherein the controller is programmed to generate a noise cancelling signal in response to signals from the microphone and to provide the noise cancelling signal to the speaker.

12. The headset of claim 9 wherein the adjustable sensor mount comprises a C-shaped base adapted to secure the adjustable sensor mount to the cushion.

13. The headset of claim 9 wherein the sensor holder is pivotably secured to the base.

14. The headset of claim 9 wherein the sensor holder is configured to slide relative to the base.

* * * * *